(12) United States Patent
Lagadapati (10) Patent No.: US 11,500,710 B1
(45) Date of Patent: Nov. 15, 2022

(54) STAND-ALONE EXCEPTION HANDLER MODULE

(71) Applicant: T-Mobile USA, Inc., Bellevue, WA (US)

(72) Inventor: Ravi Lagadapati, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 17/214,315

(22) Filed: Mar. 26, 2021

Related U.S. Application Data (60) Provisional application No. 63/000,420, filed on Mar. 26, 2020.

(51) Int. Cl.
*G06F 11/07* (2006.01)

(52) U.S. Cl.
CPC ...... *G06F 11/0772* (2013.01); *G06F 11/0769* (2013.01); *G06F 11/0784* (2013.01); *G06F 11/0793* (2013.01)

(58) Field of Classification Search
CPC ............. G06F 11/0772; G06F 11/0769; G06F 11/0784; G06F 11/0793
USPC .......................................................... 714/48
See application file for complete search history.

(56) References Cited

U.S. PATENT DOCUMENTS

2010/0235613 A1\* 9/2010 Baldwin ................. G06F 9/542
712/E9.032

OTHER PUBLICATIONS

Wikipedia "C++" page from date Mar. 23, 2020m retrieved using the Wayback Machine, from https://web.archive.org/web/20200323173803/https://en.wikipedia.org/wiki/C%2B%2B#Exception_handling (Year: 2020).\*

\* cited by examiner

*Primary Examiner* — Yair Leibovich
(74) *Attorney, Agent, or Firm* — Brownstein Hyatt Farber Schreck, LLP (57) ABSTRACT

An application framework that provides field configuration of exception handlers by one or more applications, rather than defining exceptions at runtime. The exception handler may operate as a remote service in communication with an application executing locally. When an exception is received, the exception handler can consume the exception and return a defined object based on the exception type.

20 Claims, 5 Drawing Sheets

STAND-ALONE EXCEPTION HANDLER MODULE

CROSS-REFERENCE TO RELATED APPLICATION(S)

This application is a nonprovisional patent application of and claims the benefit of U.S. Provisional Patent Application No. 63/000,420, filed Mar. 26, 2020 and titled "Stand-Alone Exception Handler Module," the disclosure of which is hereby incorporated herein by reference in its entirety.

FIELD

Embodiments described herein relate generally to mobile devices that provide customized exception handling of errors during runtime of an application, and more particularly to devices executing a local application to receive and display content, as well as dynamically handle and report errors occurring during content streaming.

BACKGROUND

Conventional error or exception handling functionality is typically customized by developers and compiled. Static exception handling generally defines errors, and how those errors are handled, prior to compiling code. Dynamic exception handling typically defines errors and error handling when code is compiled, or when code is executed. Dynamic exception handling generates code that continually updates structures about the program state. Dynamic exception handling permits code to operate even in the event of an error, insofar as the error is offloaded to an exception handler that is defined as part of the compilation process.

It may be challenging for developers to adequately account for all possible exceptions at each exception handler block present in a large application. This can lead to crashes, or other unexpected behavior, of applications in the field due to unhandled exceptions.

SUMMARY

Embodiments described herein relate generally to an application framework that provides field configuration of exception handlers by one or more applications, rather than defining exceptions at runtime. As one non-limiting example, a host server may execute or host an application or data structure that includes, processes, or handles configuration values (such as a key-value format) that define operation of an exception handler that may be separate from an end-user application. The exception handler may be executed by the host server or another remote computing device. That is, the exception handler may operate as a remote service in communication with an application executing locally. When an exception is received, the exception handler can consume the exception and return a defined exception handling structure (or "object") based on the exception type. The data structure or application executed by the host server may be implemented in any suitable file/object notation protocol, one example of which is JSON.

This allows different developers of different applications of the same organization to handle exceptions in the same way, for a consistent cross-application user experience. Accordingly, embodiments described herein may dramatically simplify debugging for developers as well because error/exception codes are uniform across applications.

Additionally, embodiments described herein permit exceptions to be generated locally, for example on a mobile device executing an application, and passed across a network to a remote module that handles these exceptions. The remote module may be in communication with, and handle exceptions from, multiple mobile devices. This may centralize error reporting and/or handling, thereby removing processing burdens from local devices. These embodiments may likewise permit common error handling by a single instance of a module for multiple local instantiations of an application, each of which may be executed locally be a different mobile device.

One sample embodiment described herein may take the form of a system for handling exceptions generated by an electronic device, comprising: an electronic device configured to: access content from a host server; and generate an exception in response to an error presenting the content; and a remote server comprising a stand-alone exception handler and configured to: receive the exception from the electronic device; determine, using the stand-alone exception handler, an exception class of the exception; create, using the stand-alone exception handler, a exception object; and transmit, to the electronic device, the exception object; wherein: the electronic device is further configured to, upon receipt of the exception object, address the error, according to the exception object; and the exception object is transmitted to multiple other electronic devices.

Another sample embodiment may take the form of a method for instantiating a stand-alone exception handler, comprising: defining a custom exception; saving a custom exception to a set of assets; defining a service exception; saving the service exception to a second set of assets; customizing a set of exception classes; and instantiating the stand-alone exception handler, which includes the set of exception classes.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments described herein relate generally to an application framework that provides field configuration of exception handlers by one or more applications, rather than defining exceptions at runtime. As one non-limiting example, a host server may execute or host an application or data structure that includes, processes, or handles configuration values (such as a key-value format) that define operation of an exception handler that may be separate from an end-user application. The exception handler may be executed by the host server or another remote computing device. That is, the exception handler may operate as a remote service in communication with an application executing locally. When an exception is received, the exception handler can consume the exception and return a defined exception handling structure (or "object") based on the exception type. The data structure or application executed by the host server may be implemented in any suitable file/object notation protocol, one example of which is JSON.

This allows different developers of different applications of the same organization to handle exceptions in the same way, for a consistent cross-application user experience. Accordingly, embodiments described herein may dramatically simplify debugging for developers as well because error/exception codes are uniform across applications.

Additionally, embodiments described herein permit exceptions to be generated locally, for example on a mobile device executing an application, and passed across a network to a remote module that handles these exceptions. The remote module may be in communication with, and handle exceptions from, multiple mobile devices. This may centralize error reporting and/or handling, thereby removing processing burdens from local devices. These embodiments may likewise permit common error handling by a single instance of a module for multiple local instantiations of an application, each of which may be executed locally be a different mobile device.

Generally and broadly, exception handler modules, as described herein, may consolidate and streamline exception handling mobile applications. Embodiments may provide a congruent solution that can provide consistent reporting of errors and their handling to disparate developers. This includes but, is not limited to, system exceptions (such a null pointer) as well as custom exceptions that have been defined by a client device, in accordance with developer-set guidelines.

By implementing a stand-alone exception handler module, the module can communicate with, and be used by, any mobile application. Further, the exception handler module (when stand-alone) may communicate with, and be called by, other individual modules (whether local or remote) or by a development kit as a whole. Additionally, a stand-alone exception handler module permits definition of errors or other exceptions during design phase of a module or application and may auto-generate exception classes and enumerations when an application is built or executed.

Certain embodiments may include or otherwise define custom exceptions and runtime exceptions to be handled by the exception handler module. Typically, custom exceptions are client-defined exceptions that are generated when mandatory criteria (e.g., criteria required for a client application to operate) are not met. Examples of custom exceptions include a missing input, a lack of a network connection (presuming the network connection is used for or during the application's execution), an invalid input, and/or an illegal state.

Runtime exceptions include system exceptions (e.g., exceptions or errors that relate to system operation), I/O exceptions (e.g., exceptions or errors that relate to faulty inputs or outputs), and service exceptions (e.g., exceptions or errors that relate to operation of a source system, such as a system transmitting or receiving data to a client application executing on a mobile device, a system operating the exception handler module, or the like). Example system exceptions include a null pointer, an out of bounds array, parsing exceptions, and security exceptions. Example I/O exceptions include socket timeouts, read timeouts, SSL exceptions, and unknown host errors. Sample service exceptions include EUI errors, NokNok errors, and shape library errors. It should be appreciated that the sample runtime exceptions and custom exceptions are examples and not comprehensive lists.

These and other embodiments are discussed below with reference to FIGS. 1-6. However, those skilled in the art will readily appreciate that the detailed description given herein with respect to these Figures is for explanatory purposes only and should not be construed as limiting.

Figure 1:
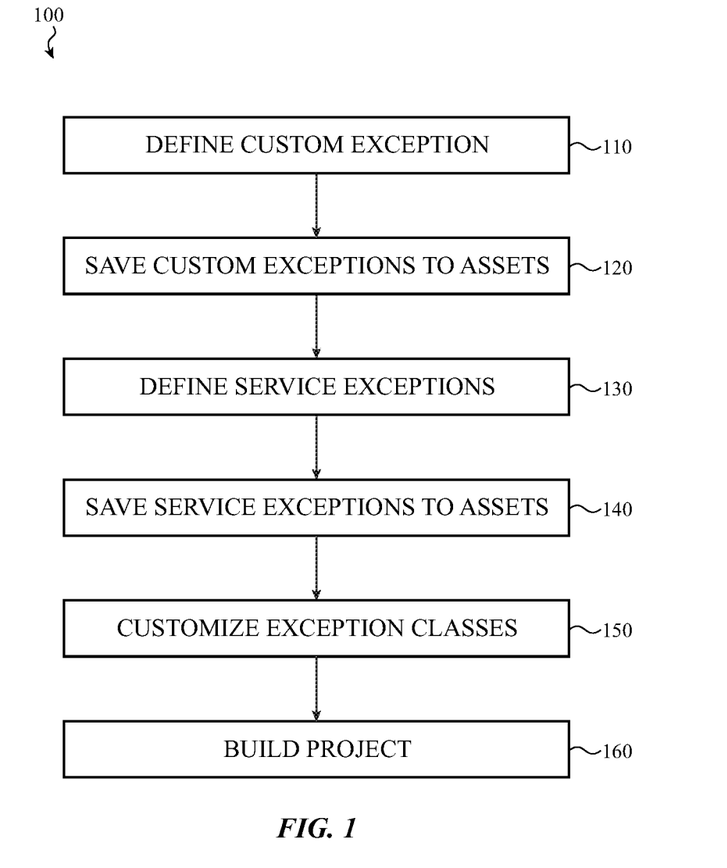
FIG. 1 is a sample flowchart detailing a method for instantiating a stand-alone exception handler module that may be operated by a remote server and receive exceptions from applications operating on local, mobile devices.

FIG. 1 is a sample flowchart detailing a method 100 for instantiating a stand-alone exception handler module that may be operated by a remote server and receive exceptions from applications operating on local, mobile devices. Initially, in operation 110, custom exceptions are defined. In operation 120, the defined custom exceptions are saved as assets. The following code is one non-limiting example of how operations 110 and 120 may be performed in a JSON format.

```
[{
    "EXCEPTION_NAME":"MISSING_INPUT",
    "ENUM_NAME":"MISSING_USERID",
    "ERROR_CODE":"1001",
    "DEFAULT_ERROR_MESSAGE":"Missing
       USER_ID"
},
{
    "EXCEPTION_NAME":"MISSING_INPUT",
    "ENUM_NAME":"MISSING_APPLICATION_CON-
       TEXT",
    "ERROR_CODE":"1002",
    "DEFAULT_ERROR_MESSAGE":"Requires Application Context"
},
{
    "EXCEPTION_NAME":"NO_NETWORK",
    "ENUM_NAME":"NO_NETWORK",
    "ERROR_CODE":"1003",
    "DEFAULT_ERROR_MESSAGE":"No Internet"
}]
```

In operation 130, service exceptions may be defined, while the service exceptions may be saved as assets in operation 140. Sample code for performing operations 130 and 140 in a JSON format follows.

```
[{
    "EXCEPTION_NAME":  "INVALID_CLIENT_O-
       AUTH",
    "SERVICE_ERROR_CODE": "invalid_scope",
    "DEFAULT_ERROR_MESSAGE": "Provided Scopes
       are Invalid"
},
```

```
{
    "EXCEPTION_NAME": "BACKEND_SYSTEM_
        EXCEPTION",
    "SERVICE_ERROR_CODE": "DB_CONNECTIVI-
        TY_ERROR",
    "DEFAULT_ERROR_MESSAGE": "Unable to con-
        nect to DAT DB"
},
{
    "EXCEPTION_NAME": "CARRIER_TOKEN_EX-
        CEPTION",
    "SERVICE_ERROR_CODE": "91003",
    "DEFAULT_ERROR_MESSAGE": "Error validating
        carrierToken"
},
{
    "EXCEPTION_NAME": "CARRIER_TOKEN_EX-
        CEPTION",
    "SERVICE_ERROR_CODE": "91006",
    "DEFAULT_ERROR_MESSAGE": "Error validating
        carrierToken"
    }
]
```

Following operation 140, exception classes may be customized by editing template files, if desired. It should be understood that operation 140 is optional. Likewise, it should be understood that operations 110-120 may be swapped in order with operations 130-140, such that operations 110-120 may occur after operations 130-140.

Next, in operation 160, the project may be built, compiled, instantiated or otherwise prepared, thereby completing the method 100.

Figure 2:
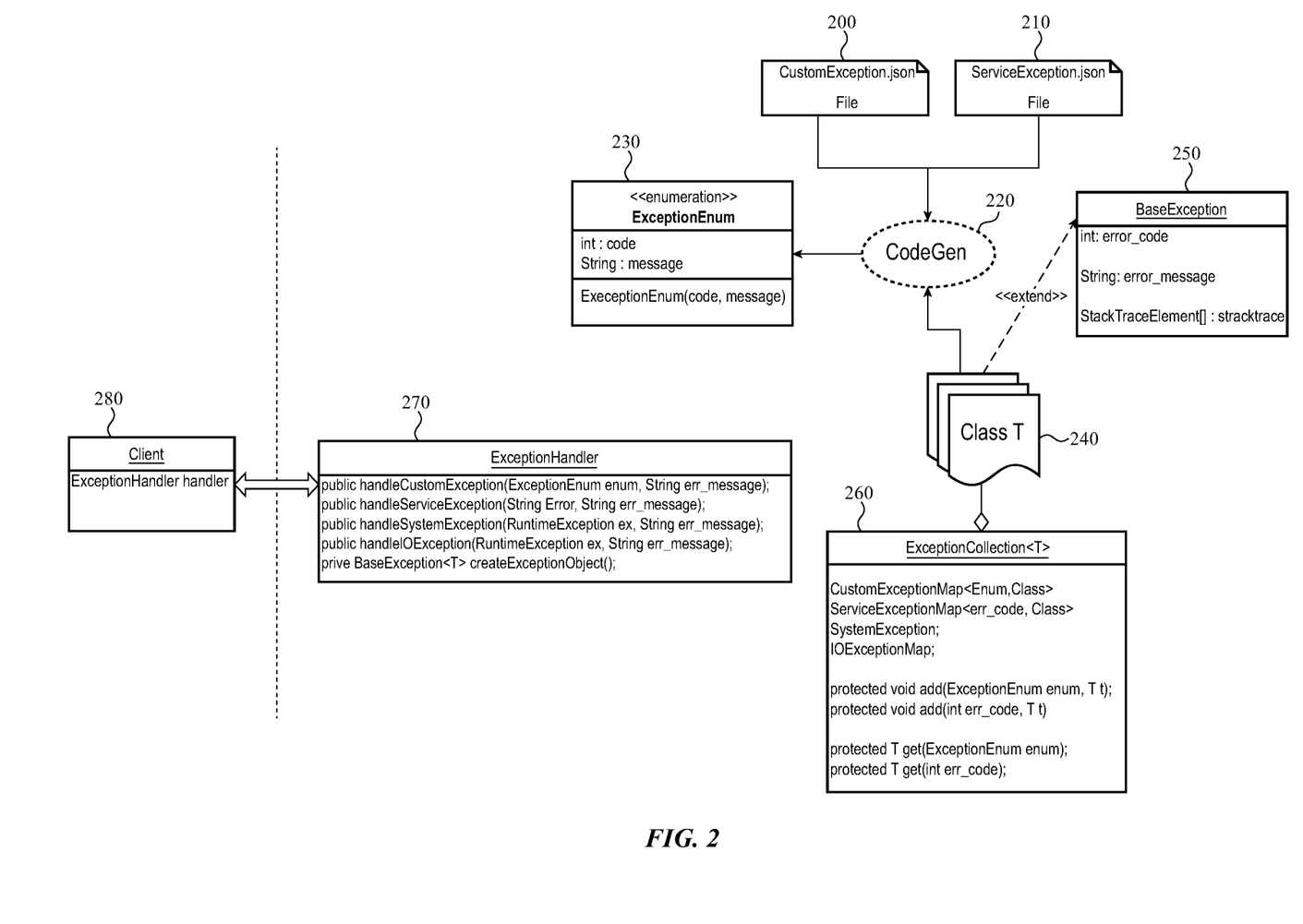
FIG. 2 shows a sample architecture in which an exception handler module may operate.

FIG. 2 shows a sample architecture in which an exception handler module 270 may operate. The custom exception assets 200 and service exception assets 210 (here shown as files) may be ingested by a code generator 220. The code generator 220 may output an exception enumeration list 230 (here, titled "ExceptionEnum") and a set of classes 240. The system may use the set of classes 240 to generate an exception collection 260 and a set of base exceptions 250. The exception enumeration list 230, exception collection 260, and set of base exceptions 250 may be used by the stand-alone exception handler module to receive, log, and process exceptions received across a network from a remote client 280, such as an application executing on a mobile device. The application may, for example, access or otherwise receive content from a remote server and display that content to a user. The content may be audiovisual in nature, including audio-only content or visual-only content as well as content that combines audio and visual components (e.g., streaming media). In some embodiments the exception handler 270 may be resident on a host server that also serves or otherwise provides such content to the client device 280, while in other embodiments the exception handler and content are resident on separate servers.

FIGS. 3-6 generally show communication sequence diagrams detailing exception reporting between a remote client application 280 and a stand-alone exception handler 270. Each diagram is discussed in turn. Generally, any communication between the client 280 and exception handler module 270 may be transmitted across any suitable network, including public networks such as the internet, private networks, wired networks, wireless networks, and so on. Further, in some embodiments a same or similar network is used by the client device both to communicate with the exception handler module and to receive or access content, while in other embodiments different networks may be used.

Figure 3:
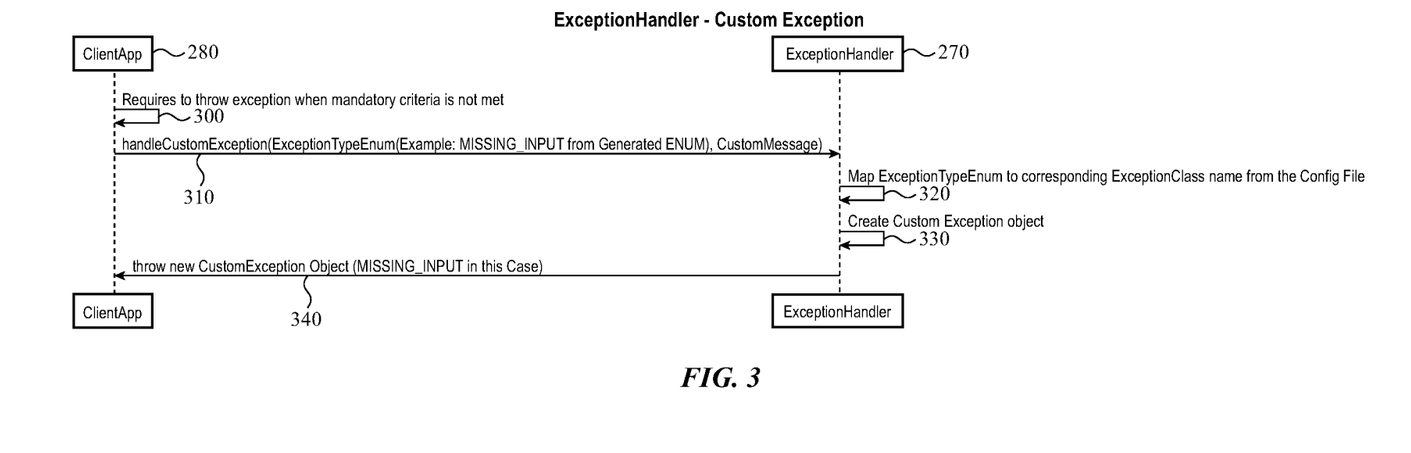
FIG. 3 is a sequence diagram showing how custom exceptions are handled between a client application and a stand-alone remote exception handler module.

FIG. 3 is a sequence diagram showing how custom exceptions are handled between a client application 280 and a stand-alone remote exception handler module 270. Initially, an error state or operation may be generated during operation of the client application 280 on an electronic device. This may occur when certain operating criteria are not met. Accordingly, the client application 280 "throws" or generates the exception in communication 300. The custom exception is transmitted from the client application 280 to the stand-alone remote exception handler 270 as part of communication 310, at which point the remote exception handler may map the exception type to an exception class (shown as sequence 320) and create a custom exception object (shown as sequence 330). The custom exception object may be thrown (e.g., transmitted or otherwise communicated) across the network to the client application 280, which may implement the custom exception to address the initial error. The custom exception object may be thrown to multiple client applications 280, and may be thrown to some client applications prospectively (e.g., before those client applications generate a similar custom exception) to enhance their ability to address such exceptions and reduce calls to the exception handling module 270. As one non-limiting example, where a client electronic device is streaming content or otherwise outputting content to a user, an exception (including, but not limited to, a custom exception) can be used to modify how that content is outputted, how the application operates to display content, substituting different content for missing content, addressing application crashes, and so on. In some cases, custom exceptions generated by a first application operating on a first client device may cause custom exception objects pushed to other applications on other client devices to take action to avoid similar errors (for example, changing a path to, or source of, content, updating the applications in advance of their displaying content, providing "route-around" functionality for the application in the case of network errors, and so on). Embodiments are not limited to use in content streaming applications or client devices; the disclosure herein can be used with any application of a client device in order to address errors. Accordingly, examples revolving around content are non-limiting.

Figure 4:
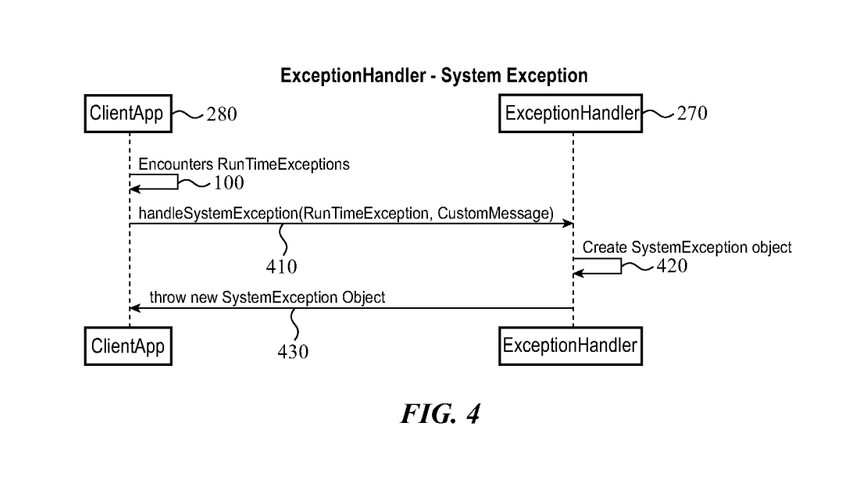
FIG. 4 is a sequence diagram showing how system exceptions are handled between a client application and a stand-alone remote exception handler module.

FIG. 4 is a sequence diagram showing how system exceptions are handled between a client application 280 and a stand-alone remote exception handler module 270. Initially, the client application 280 encounters a system exception, such as a runtime exception, and throws this exception in communication 400. In communication 410, the client application 280 transmits the system exception and a request to handle the exception to the stand-alone exception handler module 270. The exception handler module 270 then may create a system exception object 420, and transmit that system exception object back to the client application 280 as part of communication 430. The client application 280 may then use the system exception object to process the error.

Figure 5:
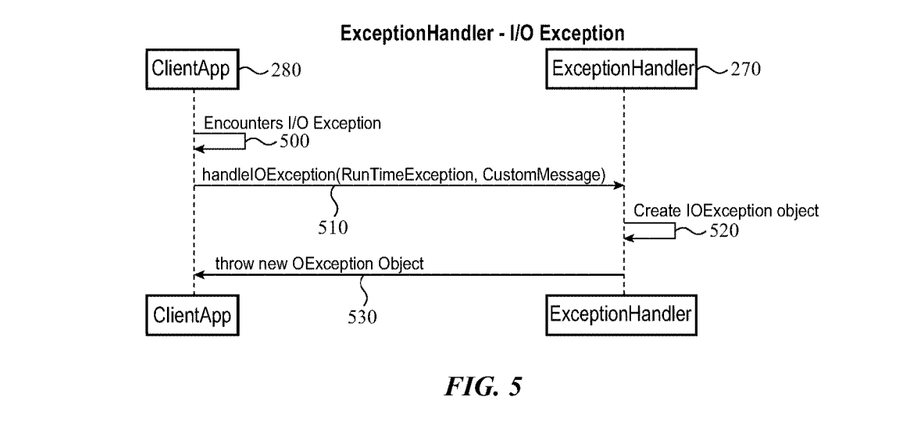
FIG. 5 is a sequence diagram showing how I/O exceptions are handled between a client application and a stand-alone remote exception handler module.

FIG. 5 is a sequence diagram showing how I/O exceptions are handled between a client application 280 and a stand-alone remote exception handler module 270. Initially, the client application 280 may encounter an I/O exception, shown in FIG. 5 as communication 500. A request to handle the I/O exception, optionally along with the I/O exception itself, is transmitted across a network to the exception handler in communication 510. The stand-alone exception handler module 270 may create an I/O exception object (shown here as communication 520) and transmit ("throw") that object across the network to the client application 280 so that the client application may process the initial error.

Figure 6:
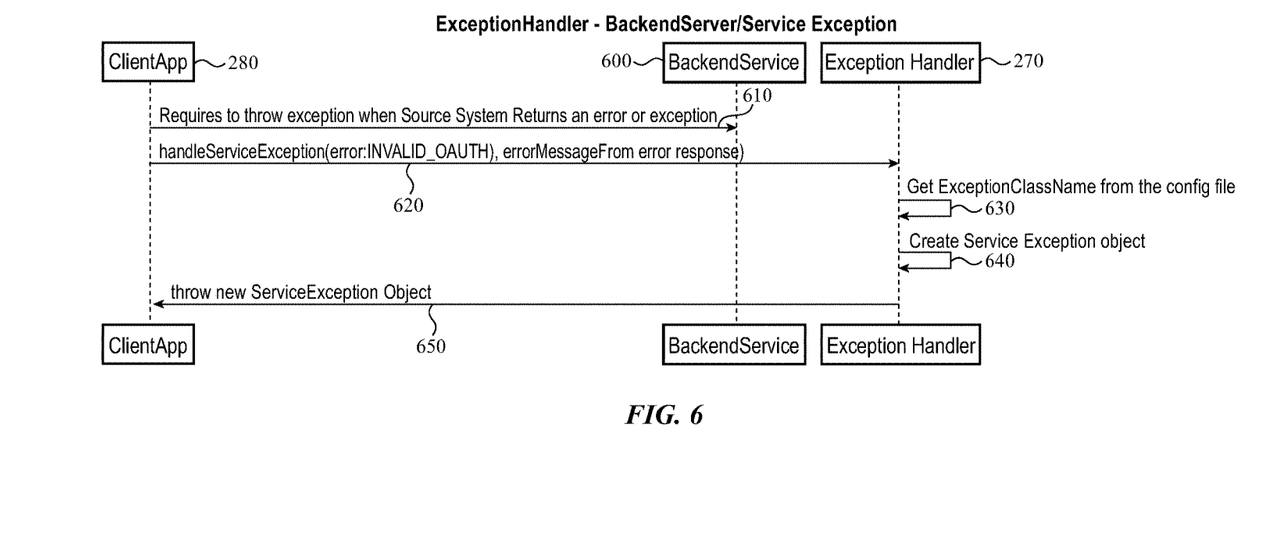
FIG. 6 is a sequence diagram showing how service exceptions are handled between a client application and a stand-alone remote exception handler module.

FIG. 6 is a sequence diagram showing how service exceptions are handled between a client application 280 and a stand-alone remote exception handler module 270. Initially, the client application 280 throws a service exception to a backend service 600 as part of communication 610. The client application 280 may also throw a request to handle the service exception to the stand-alone exception handling module 270 as part of communication 620. In some embodiments, communication 620 may likewise include the service exception; in yet other embodiments, the backed service 600 may communicate the service exception to the exception handler module 280. In turn, the stand-alone exception handler module 270 may get an exception class as part of operation 630 and create a service exception object in operation 640. Communication 50 may then transmit the service exception object to the client application 280, thereby permitting the client application to address the initial exception.

Embodiments described herein may be useful in a variety of situations and for a variety of groups. For example, embodiments employing a stand-alone exception handler module that is separated from one or more reporting client applications by a network may be useful for organizations where API developers are separated (physically or logistically) from application developers. Likewise, such embodiments may be useful in presenting uniform error codes to users of different applications that experience the same issue. Such embodiments may be used to prospectively push or throw error handling to multiple clients, even where those clients have not experienced the error in question; an exception request may be generated by a first client, processed by the stand-alone exception handler, and pushed to the first client and a group or batch of additional clients in order to ensure the additional clients can locally address the error if or when it occurs. Embodiments described herein may also reduce developer load by reducing a number of test units required to verify compliance with a set of errors. Embodiments may also reduce developer load by freeing developers from updating error-handling code blocks.

Embodiments may be configured to handle exceptions in any number of environments and with respect to any number of data sets. For example, embodiments may be configured to operate with content streaming applications, gaming applications (including multiplayer gaming), synchronous document editing, and the like. Any or all of these applications may benefit from an embodiment including a remote stand-alone exception handler module configured to receive an exception from a client application, address the exception, and communicate the corresponding exception object to one or multiple clients.

Figure 7:
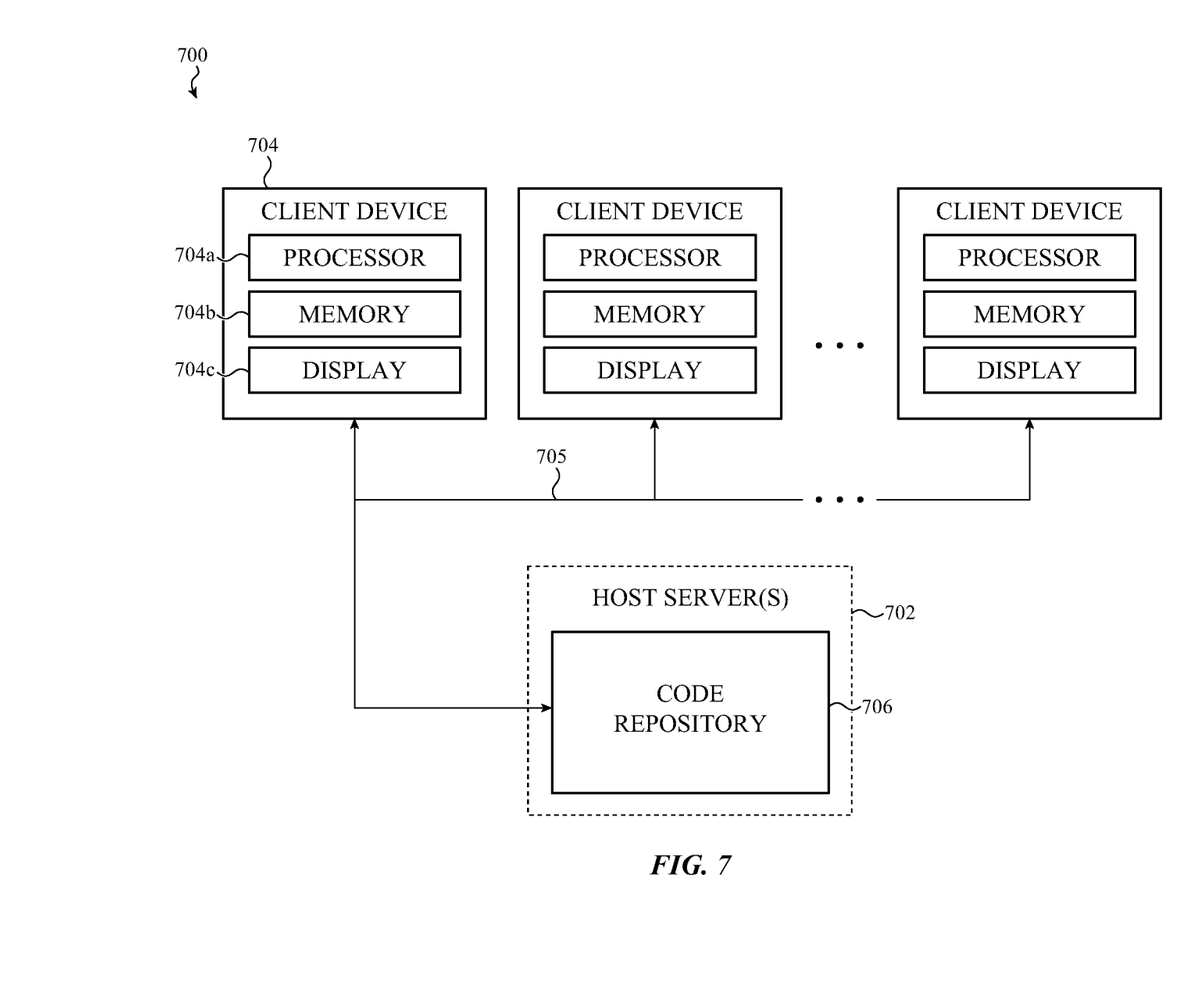
FIG. 7 illustrates a sample architecture in which a stand-alone remote exception handler module may operate.

FIG. 7 is a schematic representation of a portion of an example application exception error handling environment, such as described herein. It may be appreciated that the example environment depicted in FIG. 7, identified as an application exception error handling environment 700, may be suitably configured to perform any operation described herein, including those functions, operations, and steps described above or below without specific reference to the enumerated elements of FIG. 7 or to the drawing itself. For brevity, such examples are not repeated here with specific reference to FIG. 7. Instead, it is appreciated that example embodiments presented elsewhere herein can be effectuated by application exception error handling environment 700, depicted in FIG. 7; nothing described herein should be construed as limiting the disclosure or claims to only those examples presented with direct reference to the figures, including FIG. 7.

In the illustrated embodiment, application exception error handling environment 700 is implemented with a client-server architecture including a host server 702 that communicably couples (e.g., via one or more networking or wired or wireless communication protocols) to one or more client devices, one of which is identified as the client device 704. It may be appreciated that other client devices may be configured in a substantially similar manner as the client device 704 (described below), although this may not be required of all embodiments and different client devices can be configured differently and/or may transact data or information with, and/or provide input(s) to and receive output(s) from, the host server 702 in a unique or device-specific manner.

The client device 704 can be any suitable personal or commercial electronic device and may include, without limitation or express requirement, a processor 704a, volatile or non-volatile memory (identified, collectively, as the memory 704b), and a display 704c. Example electronic devices include, but are not limited to: laptop computers; desktop computers; cellular phones; tablet computing devices; thin clients; set-top boxes; and so on. It may be appreciated that a client device 704, such as described herein, can be implemented in any suitable manner.

In many embodiments, the processor 704a of the client device 704 can be configured to execute an application (herein referred to as a "client application") stored, at least in part, in the memory 704b. The client application is configured to access and communicate with the host server 702 and to securely transact information or data with, and provide input(s) to and receive output(s) from, the host server 702. In some embodiments, the client application may be a video streaming application configured to access content or a service hosted by the host server 702 that is accessible to the client device 704 over a private or public network that may, in some embodiments, include the open internet. In other cases, the client application may be a native application. The host server 702 may stream live or cached content to the client device 704 across the network and may receive exceptions from the client device 704 to be handled as described herein. Exceptions may be generated by the client device and transmitted to the host, also as described herein.

In many embodiments, the host server 702 is configured to operate within or as a virtual computing environment that is supported by one or more physical servers including one or more hardware resources such as, but not limited to (or requiring) one or more of: a processor; a memory; non-volatile storage; networking connections; and the like. For simplicity of description and illustration, these example hardware resources are not shown in FIG. 7.

In many embodiments, the host server 702 can include a number of discrete subservices or purpose-configured modules, containers, or virtual machines each configured to perform, coordinate, serve, or otherwise provide one or more services, functions, or operations of the host server 702, such as the operations of: (7) serving content of application exception error handling environment 700, such as audio-visual data steams or the like, from content storage (or, in some cases, passing along content from another source, such as live content) to one or more client devices communicably coupled to the host server 702, and (2) operating an exception handling application or service ("exception handler"), such as described herein.

Embodiments described herein can configure a host server (e.g., the host server 702) in a number of suitable ways. In one embodiment, depicted in FIG. 7, the host server 702 of application exception error handling environment 700 can include an exception handler module (as discussed above) that receives exceptions from a client device 704 and handles these exceptions to ensure that content viewed, streamed, or otherwise transmitted to the client device 704 is displayed without (or with limited) interruption.

In many embodiments, the host server 702 is configured to host a communication interface, such as an Application Programming Interface ("API") that may be accessed by one or more components or modules of the host server 702 and/or one or more remote devices, such as the client device 704. The API hosted by the code repository service 706 can gate or otherwise control access to content stored in the database(s) of the code repository service 706, including access to an exception handler module. For example, the code repository service 706 may respond only to authenticated queries to access code repositories. The exception handler module may be part of, included in, instantiated in, or otherwise represented by the code repository service 706, as well.

Certain embodiments may include or otherwise define custom exceptions and runtime exceptions to be handled by the exception handler module. Typically, custom exceptions are client-defined exceptions that are generated when mandatory criteria (e.g., criteria required for a client application to operate) are not met. Examples of custom exceptions include a missing input, a lack of a network connection (presuming the network connection is used for or during the application's execution), an invalid input, and/or an illegal state.

Runtime exceptions include system exceptions (e.g., exceptions or errors that relate to system operation), I/O exceptions (e.g., exceptions or errors that relate to faulty inputs or outputs), and service exceptions (e.g., exceptions or errors that relate to operation of a source system, such as a system transmitting or receiving data to a client application executing on a mobile device, a system operating the exception handler module, or the like). Example system exceptions include a null pointer, an out of bounds array, parsing exceptions, and security exceptions. Example I/O exceptions include socket timeouts, read timeouts, SSL exceptions, and unknown host errors. Sample service exceptions include EUI errors, NokNok errors, and shape library errors. It should be appreciated that the sample runtime exceptions and custom exceptions are examples and not comprehensive lists.

Accordingly, it is appreciated that the foregoing embodiment depicted in FIG. 7 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, application exception error handling environment 700 of FIG. 7 can be implemented, architected, or configured in a number of suitable ways. As illustrated, the host server 702 includes one or more purpose-configured modules or components each configured to perform a discrete task associated with the operation of application exception error handling environment 700.

In particular, as noted above, the host server 702 includes one or more exception handler modules 706. It may be appreciated that although such functional elements are identified as separate and distinct "modules" that each includes allocations of physical or virtual resources—such as one or more processors, memory, and/or communication modules (e.g., network connections and the like) —that such an implementation is not required. More generally, it may be appreciated that the various functions described herein of a host server 702 can be performed by any suitable physical hardware, virtual machine, containerized machine, or any combination thereof.

The foregoing embodiment depicted in FIG. 7 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A system for handling exceptions generated by an electronic device, comprising:
   an electronic device configured to:
      locally execute an application on the electronic device, the application accessing content from a host; and
      generate an exception during execution of the application, in response to an error presenting the content; and
   a server, remote from the electronic device, comprising an exception handler, the exception handler operating as a remote service to the application and configured to:
      receive the exception from the electronic device;
      determine, using the exception handler, an exception class of the exception;
      create, using the exception handler, an exception object; and
      transmit, to the electronic device, the exception object; wherein:
   the electronic device is further configured to, upon receipt of the exception object, address the error, according to the exception object; and
   the exception object is transmitted to multiple other electronic devices.

2. The system of claim 1, wherein the error is a client-defined error.

3. The system of claim 2, wherein the client-defined error is one of a missing input, a lack of a network connection, an invalid input, or an illegal state.

4. The system of claim 1, wherein the host is provided by the server.

5. The system of claim 1, wherein the content comprises streaming content.

6. The system of claim 1, wherein the exception object is transmitted to multiple applications executed by the multiple other electronic devices.

7. The system of claim 1, wherein the multiple other electronic devices include a cellular phone.

8. A method for instantiating and operating a stand-alone exception handler, comprising:
defining a custom exception;
saving a custom exception to a set of assets;
defining a service exception;
saving the service exception to a second set of assets;
customizing a set of exception classes;
instantiating, at a server, the stand-alone exception handler, the stand-alone exception handler including the set of exception classes;
receiving, at the stand-alone exception handler, exceptions from multiple applications executed by multiple electronic devices that are remote from the server; and
processing the exceptions for the multiple applications, at the stand-alone exception handler, as a remote service.

9. The method of claim 8, wherein the multiple applications include a content streaming application.

10. The method of claim 8, wherein the multiple electronic devices include a cellular phone.

11. A method of handling exceptions apart from a set of applications executed on a set of electronic devices, comprising:
receiving, at an exception handler executed by a server remote from the set of electronic devices, an exception thrown by a first application in the set of applications;
creating, in response to receiving the exception, an exception object;
returning the exception object to the first application; and
transmitting the exception object to at least a second application in the set of applications.

12. The method of claim 11, wherein the exception object is transmitted to the second application in response to receiving the exception from the second application.

13. The method of claim 11, wherein the exception object is transmitted to the second application prospectively, before receiving the exception from the second application.

14. The method of claim 11, wherein the set of applications includes a content streaming application.

15. The method of claim 11, further comprising:
receiving, at the exception handler, a second exception thrown by the first application in the set of applications;
creating, in response to receiving the second exception, a second exception object; and
returning the second exception object to the first application.

16. The method of claim 11, further comprising:
receiving, at the exception handler, a second exception thrown by the second application in the set of applications;
creating, in response to receiving the second exception, a second exception object; and
returning the second exception object to the second application.

17. The method of claim 16, further comprising:
transmitting the second exception object to the first application.

18. The method of claim 11, wherein at least one electronic device in the set of electronic devices communicates with the server over a wireless network.

19. The method of claim 11, wherein at least one electronic device in the set of electronic devices communicates with the server over a wired network.

20. The method of claim 11, wherein at least one electronic device in the set of electronic devices is a cellular phone.

* * * * *